No. 681,356. Patented Aug. 27, 1901.
J. P. WALKER.
BALING PRESS.
(Application filed Feb. 2, 1901.)
(No Model.) 2 Sheets—Sheet 1.
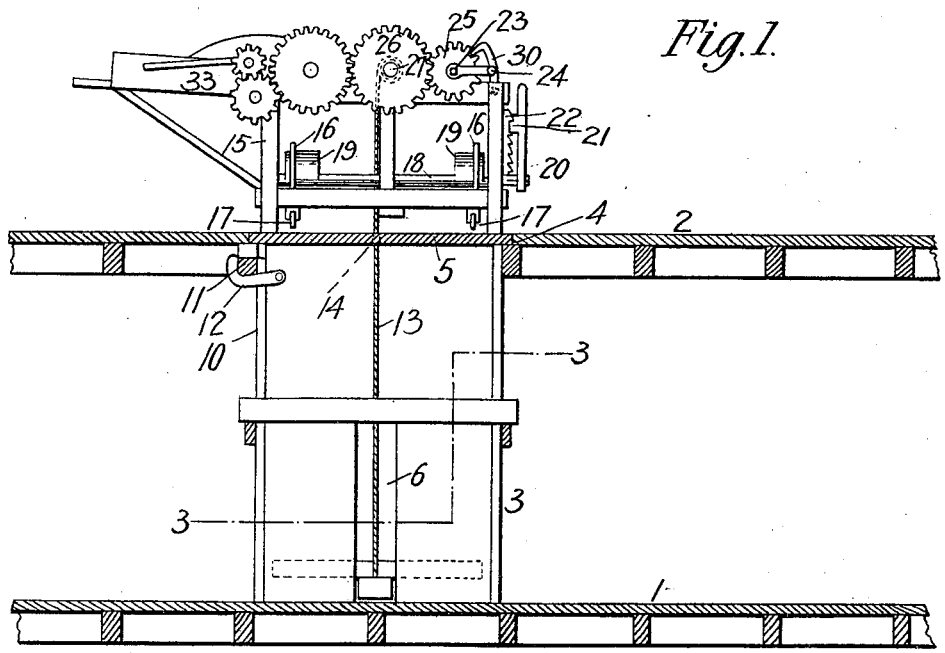
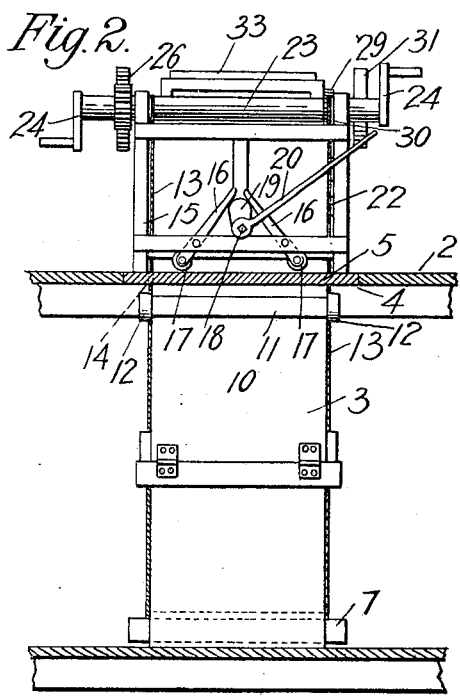
Witnesses: Inventor
Jacob P. Walker
By 
Attorneys

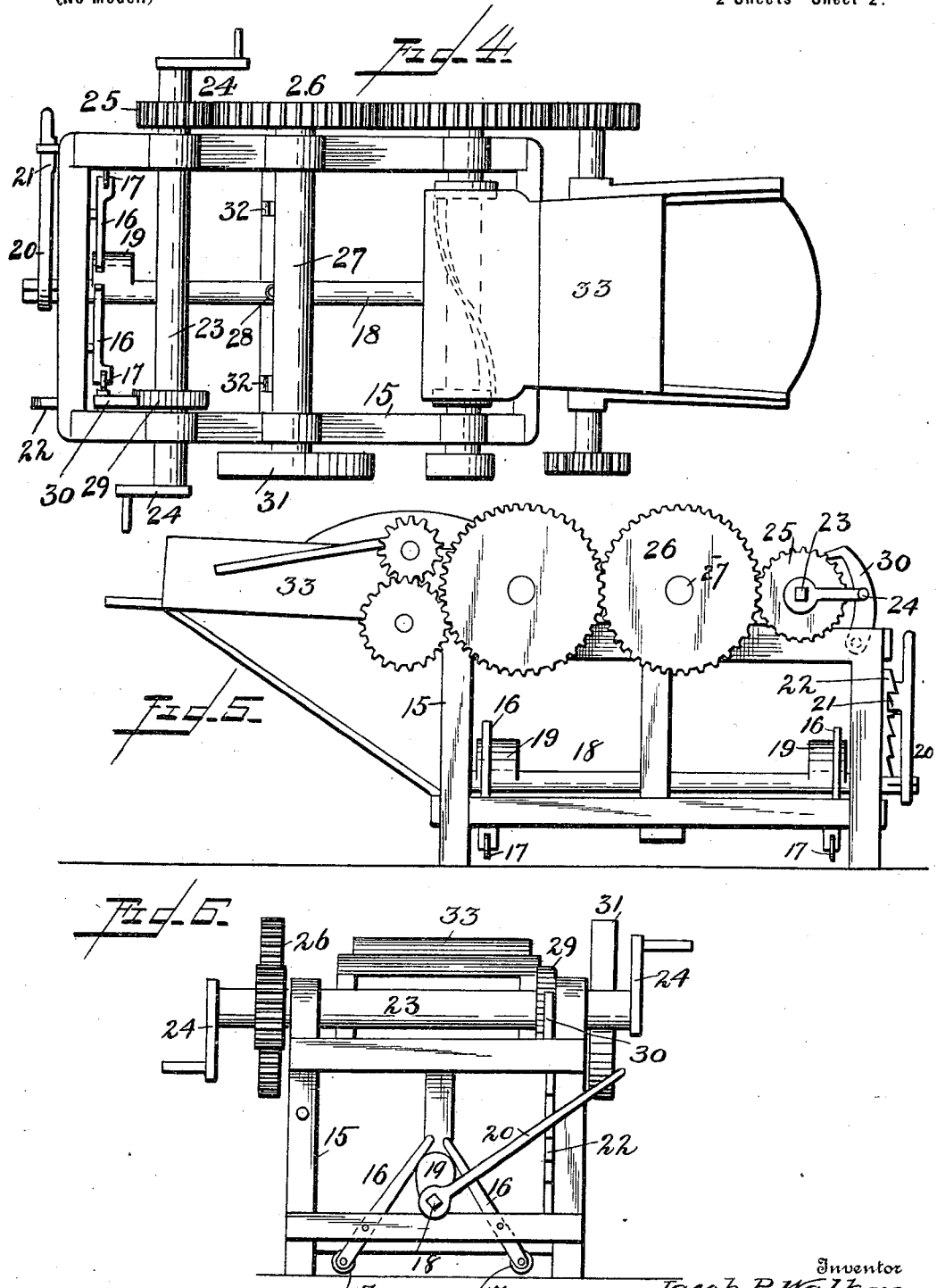

UNITED STATES PATENT OFFICE.

JACOB P. WALKER, OF HAVRE DE GRACE, MARYLAND, ASSIGNOR TO M. BARRATT WALKER, OF BALTIMORE, MARYLAND.

BALING-PRESS.

SPECIFICATION forming part of Letters Patent No. 681,356, dated August 27, 1901.

Application filed February 2, 1901. Serial No. 45,794. (No model.)

*To all whom it may concern:*

Be it known that I, JACOB P. WALKER, a citizen of the United States, residing at Havre de Grace, in the county of Harford and State of Maryland, have invented certain new and useful Improvements in Baling-Presses; and I do declare the following to be a full, clear, and exact description of the invention, such as will enable others skilled in the art to which it appertains to make and use the same.

This invention relates to improvements in baling-presses for the use of farmers and others in compressing hay for domestic use or for sale, and is designed primarily as a permanent structure in barns, stables, and like buildings, where the use of a press is desirable to pack loose hay in compact form for storage and use. The invention is thus mainly intended for the use of those raising their own crops of hay to provide a simple and convenient means for baling the same for personal use; but it will of course be understood that the essential features of the device may be employed wherever found applicable in presses designed for general baling purposes.

The object of the invention is to provide a simple, durable, and effective construction of baling-press which is adapted for the above and other analogous uses and may be readily and conveniently operated by hand or power, as desired.

The invention consists of certain novel features of construction, combination, and arrangement of parts, which will be hereinafter more fully described, and particularly pointed out in the appended claim.

In the accompanying drawings, Figure 1 is a vertical sectional view through floors of a barn, stable, or other like structure, showing the press box or chamber in side elevation and showing the power mechanism in position for operation. Fig. 2 is a similar section taken at right angles to that shown in Fig. 1 and showing the press box or chamber in end elevation on the line 3 3 of Fig. 1. Fig. 3 is a horizontal section of the press-box. Figs. 4, 5, and 6 are respectively a top plan view, a side elevation, and an end elevation of the power frame and gearing.

Referring now more particularly to the drawings, the numerals 1 and 2 represent the upper and lower floors of a two-story barn, stable, or other like building in which the lower story may be used for stabling horses or cattle or for other purposes and the upper story as a loft for the storage of hay, fodder, grain, &c., to be used as feed. These floors constitute supporting-platforms for the press-box and power mechanism of the press. Between these two floors extends the press box or chamber 3, which is designed as a permanent structure, and at its upper end is in communication with an opening 4 in the loft-floor 2, which opening is adapted to be closed by a trap-door 5. The sides of the chamber 3 are formed in their lower halves with vertical slots 6, in which slide the projecting ends of a cross-bar 7, carrying a vertically-movable follower or plunger 8. At one end the chamber is provided with a solid wall, in which are provided vertical slots 9, and at the opposite end the upper half of the chamber is open and is adapted to be closed by a door 10, hinged at its lower end thereto and provided at its upper end with cross-bar 11, with which are adapted to engage hooks 12, pivoted to the side walls of the chamber to hold said door closed. A rope or cable 13 is secured at its lower end to each projecting end of the bar 7 and passes therefrom upward through openings 14 in the door 5 to the loft above.

In the loft is arranged the power mechanism for operating the plunger, the same consisting of a windlass comprising a rectangular frame 15, provided at each end with a pair of intermediately-pivoted levers 16, carrying at their lower ends traction wheels or rollers 17. These levers are adapted to have their upper ends moved outward and inward in a direction transversely of the frame to raise and lower the frame and move their lower ends in a reverse direction, and to thereby throw the rollers 17 into and out of contact with the floor. The levers thus subserve the purpose of jacks, as will be readily understood. To enable both sets of levers to be operated in unison, a shaft 18 is mounted in the lower portion of the frame and carries cams 19, which are adapted when the shaft is turned in one direction or the other to throw said levers into and out of action. A crank-handle 20 is provided to operate the shaft and carries a pawl 21 to engage a rack 22 on the frame and hold said shaft firmly in adjusted position. When the lower ends of the levers 16 are projected and the frame elevated and the rollers brought into contact with the floor 2, the said frame may be moved easily along the floor until it is over the opening 4 in position for operation, and then by retracting the rollers the frame will be lowered to rest squarely upon the door and form a firm foundation for the power-gearing. After use by simply projecting the rollers again the frame may be readily moved away from the opening to a desired part of the loft, so as to be conveniently stored away until further occasion for its use arises.

The gearing for operating the follower or plunger is mounted upon the upper portion of the frame and comprises a transverse drive-shaft 23, having crank-handles 24 at its ends, which may be used if it be desired to employ hand-labor, or one or more pulleys or gear connections may be substituted therefor if it be desired to employ power. On this shaft is a pinion 25, which meshes with a gear 26 on the adjacent end of a winding-shaft 27, having a staple 28 for the ready connection therewith and disconnection therefrom of the upper ends of the ropes or cables 13. The shaft 23 also carries a ratchet-wheel 29, which is engaged by a pawl 30 on the frame, the purpose whereof is to prevent retrograde movement of the gearing while the hay is being compressed and the bale bound. If desired, a pulley 31 may be applied upon the opposite end of the shaft 27 from the gear 26 for communicating power therefrom to any other desired type of gearing or apparatus. In the operation of the windlass the ropes or cables 13 are passed over friction-pulleys 32 on the windlass-frame to insure ease of operation.

The operation is as follows: When it is desired to use the press, the trap-door 5 is removed and the baling-chamber 3 filled from above through the mouth or opening 4. The trap-door 5 is then applied to close the opening, the windlass moved over to rest upon said door, the upper ends of the cords or cables 13 attached to the winding-shaft 27, and the windlass operated to wind up the cords upon said shaft. By this means the follower 8 will be drawn upward and the hay or straw compressed between it and the trap-door 5. While the parts are held firmly against recession by the ratchet-wheel 29 and pawl 30, the binding cords or wires may be applied by inserting them through the slots 9 and grooves in the trap-door 5 and follower 8 and tied upon opening the hinged door 10, through which the completed bale is removed. This operation is repeated until the whole amount of hay is formed into bales, when the windlass is rolled to the point desired in the loft for storage until its further use is required.

33 represents a cutter or chopper which may be employed when it is desired to bale chopped hay.

From the foregoing description, taken in connection with the accompanying drawings, the construction and mode of operation of the invention will be readily understood, and it will be seen that a simple, easily operated, and convenient form of baling apparatus is provided.

Changes in the form, proportion, and minor details of construction of the apparatus may be made within the scope of the invention without departing from the spirit or sacrificing any of the advantages thereof.

Having thus particularly described my invention, what I claim, and desire to secure by Letters Patent, is—

In a baling-press, the combination, with upper and lower supporting-platforms, said upper platform having an opening, of a baling-chamber extending between the platforms and in line with said opening and adapted to be filled through said opening, a door for closing the opening, a follower in the baling-chamber, draft ropes or cables connected to the follower and extending upwardly through the upper platform, and power mechanism adapted to be connected to said ropes or cables to draw the plunger upward so as to compress the material between the door and follower, said power mechanism being adapted to rest upon the door and by its weight to hold the door closed, and being movable toward and from the door, substantially as described.

In testimony whereof I have hereunto set my hand in presence of two subscribing witnesses.

JACOB P. WALKER.

Witnesses:
MICHAEL H. FAHEY,
ERNEST H. McCOMMONS.